United States Patent [19]

Beele

[11] Patent Number: 5,067,676

[45] Date of Patent: Nov. 26, 1991

[54] SYSTEM FOR THE PREVENTION OF FIRE, WATER OR FLUE GAS AND THE LIKE FROM PROPAGATING ALONG CABLES

[75] Inventor: Johannes A. Beele, Ke Opmeer, Netherlands

[73] Assignee: CSD International B.V., Opmeer, Netherlands

[21] Appl. No.: 507,268

[22] Filed: Apr. 10, 1990

[51] Int. Cl.$^5$ ............................................. F16L 5/00
[52] U.S. Cl. ...................................... 248/56; 52/232
[58] Field of Search ................... 248/56, 57; 52/232

[56] References Cited

U.S. PATENT DOCUMENTS

| | | | |
|---|---|---|---|
| 3,976,825 | 8/1976 | Anderberg | 248/56 X |
| 4,093,818 | 6/1978 | Thwaites et al. | 248/56 X |
| 4,249,353 | 2/1981 | Berry | 52/232 |
| 4,273,821 | 6/1981 | Pedlow | 52/232 X |
| 4,276,332 | 6/1981 | Castle | 52/232 X |
| 4,419,535 | 12/1983 | O'Hara | 52/232 X |
| 4,458,460 | 7/1984 | Kohaut | 52/232 X |
| 4,493,173 | 1/1985 | Kohaut | 52/232 X |
| 4,729,916 | 3/1988 | Feldman | 52/232 X |
| 4,889,298 | 12/1989 | Hauff | 248/56 |
| 4,919,372 | 4/1990 | Twist et al. | 248/56 |

Primary Examiner—Gary L. Smith
Assistant Examiner—Suzanne L. Dino
Attorney, Agent, or Firm—Pennie & Edmonds

[57] ABSTRACT

A system for preventing propagation of fire, fluid and or gas along cable lines, the system including a safety chute mounted along the cable line and having a sealing structure of fire resisting material detachably installed along the inner wall of the chute.

12 Claims, 6 Drawing Sheets

SYSTEM FOR THE PREVENTION OF FIRE, WATER OR FLUE GAS AND THE LIKE FROM PROPAGATING ALONG CABLES

TECHNICAL FIELD

The invention relates to a system for the prevention of fire, water or flue gas and the like from propagating along cables as well as to a safety chute and a sealing body manifestly suited to be used in the system. Such cables may, for instance, be electric cables.

BACKGROUND OF THE INVENTION

A system in which cables have been disposed in a lead-through chute is generally known. The known system is formed by coated mineral-wool plates which may be mounted around the lead-through chute in, for example, a lead-in aperture in a wall.

One drawback of the known system is that in actual practice it is often very difficult to mount these mineral-wool plates from the outside in the lead-in aperture, around the lead-through chute and round about the cables passed through the said aperture on account of their poor accessibility from the outside. A further drawback is that when additional new cables are inserted into existing lead-throughs provided with mineral-wool plates, considerable damage may be inflicted upon these plates. Moreover, the known system has the disadvantage that it can hardly, if at all, withstand mechanical loads, so that in the event of a fire a jet of fire-fighting water can easily thrust the coated mineral-wool plates out of the lead-in aperture.

SUMMARY OF THE INVENTION

The present invention provides a simple and aesthetically justified system for the prevention of fire, water or flue gas and the like from propagating along cables, which is easy to install for any size of lead-in aperture, which is capable of withstanding high mechanical loads and in which additional new cables can readily and simply be introduced into existing lead-throughs.

To this end, a system of the type mentioned above is characterized according to the invention in that it is provided with a safety chute which can be mounted along the cables and with at least one sealing body substantially made of a fire-resisting material, which body can be detachably installed along at least a part of the inner wall of the safety chute. As it is generally impossible in the event of a fire to determine beforehand on which side of a wall the fire is expected to originate, the system according to the invention should preferably be applied to both sides of the lead-through.

One embodiment of a system according to the invention is characterized in that the sealing body can be installed along at least a part of the inner wall of the safety chute, whereby an air insulation clearance is allowed between the sealing body and the said part of the inner wall of the safety chute by means of spacers provided on the sealing body. The spacers may consist of, for instance, ribs or studs. The air insulation clearance prevents a filler present in the safety chute from being readily damaged by fire owing to the heat thereby generated.

Another embodiment of a system according to the invention is characterized in that the sealing body contains at least one inner cavity. This cavity also forms an air insulation clearance for the protection, in the event of a fire, of a filler present in the safety chute.

A further embodiment of a system according to the invention is characterized in that the system is provided with a filler substantially made of a fire-resisting material which can be applied in the safety chute. This filler serves to impart sufficient "density" to the interior of the safety chute such that fire, water or flue gas cannot propagate along the cables through the safety chute.

A further embodiment of a system according to the invention is characterized in that the filler substantially consists of at least one spongy body which may expand upon contact with, for instance, fire, water or flue gas. It is this expansion which insures that the interior of the safety chute retains sufficient "density" also in the event of a fire so as to prevent fire from propagating along the cables through the safety chute.

A further embodiment of a system according to the invention is characterized in that the filler contains a fire-resisting cement.

A further embodiment of a system according to the invention is characterized in that the safety chute is substantially rectangular in section, that at least four sealing bodies can be detachably installed along corresponding sections of the inner wall of the safety chute, and that the filler can be applied between, below and above each layer of cables passed through the lead-through chute.

A further embodiment of a system according to the invention in which the cables are laid in a lead-through chute and passed through a wall is characterized in that the safety chute can be installed on at least one side of the wall with the aid of a flange of the safety chute that is substantially perpendicular to the longitudinal direction of the cables, and that the safety chute comprises a detachable cover plate.

A further embodiment of a system according to the invention in which the cables are laid in a lead-through chute and passed through a wall in the form of a floor or ceiling is characterized in that the safety chute can be installed on at least one side of the floor or ceiling with the aid of a flange of the safety chute that is substantially perpendicular to the longitudinal direction of the cables, and that the safety chute is fully installed, when sealed off by a closing device. This closing device is formed by, for instance, a separate plate of filler material A further embodiment of a system according to the invention is characterized in that the system comprises a gasket which may be inserted between the flange and the wall, floor or ceiling.

A further embodiment of a system according to the invention in which cables are laid in a lead-through chute as part of a cable routing system is characterized in that the safety chute can be attached to the lead-through chute by means of a detachable cover plate of the safety chute.

It is to be observed that the system according to the invention afford protection to cables accommodated in, for instance, a lead-through chute, not only against fire, but also against harmful gases or water and the like, because the waterproof, gasproof and flameproof sealing afforded by the system prevents fire, gases or water from propagating along the lead-through chute.

BRIEF DESCRIPTION OF THE DRAWINGS

FIG. 1 is an exploded view of one embodiment of a system according to the invention, in which cables 2 inserted into a lead-through chute 1 are passed through a lead-in aperture in a wall 3. A safety chute 4 mounted along the lead-through chute 1 comprises a flange 5 that is perpendicular to the longitudinal direction of the cables 2, by means of which the safety chute 4 can be attached to one side of the wall 3 with a gasket 6 interposed. The safety chute 4, which is substantially rectangular in section, has all its inner walls provided with sealing bodies 7 made of a fire-resisting material, of which there are only two visible in this figure. The interior of the safety chute 4 contains a filler 8 applied between, below and above the cables 2 in the form of spongy bodies also made of a fire-resisting material. Furthermore the safety chute 4 comprises a detachable cover plate 9 and a detachable flanged section 10, both of which can be attached to a flange 13 of the safety chute 4 running parallel to the longitudinal direction of the cables 2.

FIG. 2 shows the embodiment of the system of FIG. 1 fully mounted.

FIG. 3 represents an embodiment of a system according to the invention fully mounted, in which cables 2 inserted into a lead-through chute 1 are passed through a lead-in aperture in a wall in the form of a floor or ceiling 11. In the assembled state, a safety chute 4 is sealed off at the top by a closing device in the form of a separate plate 12 of filler material, so that for this application it is not necessary to use the detachable cover plate 9 and the detachable flanged section 10 of FIG. 1. The component parts of the system shown in FIG. 3 which correspond with those of FIG. 1 have been indicated with the same reference numerals.

FIG. 4 is a partly exploded view of an embodiment of a system according to the invention in which cables 2 have been disposed in a lead-through chute 1 as part of a cable routing plan. A safety chute 4 is attached with its flange 13 to the lead-through chute 1 by means of a detachable cover plate 9. This cover plate 9 is here composed of two cover parts 9' and two suspension straps 9''. The cover parts 9' lightly compress the cables 2 and the filler 8. If the cables 2 have been laid in a highly irregular pattern—say, cables with large and small diameter side by side—voids between these cables 2 may, if necessary, be filled up with a fire-resisting cement. Component parts represented in this figure which correspond with those of FIG. 1 bear the same reference numerals.

FIG. 5 shows the system of FIG. 4 when fully mounted.

As shown in FIG. 6, the sealing bodies 7 represented in FIG. 1, 4 and 5 are provided with spacers in the form of ribs 14, so that these sealing bodies 7 can be installed along the inner walls of the safety chute 4, making allowance for an air insulation clearance. As a result, the filler 8 will be less liable to damage in the event of a fire by the heat thereby generated. FIG. 6 is a perspective view of such a sealing body 7 containing several inner cavities 15, here indicated by dashed lines.

Figure 1:
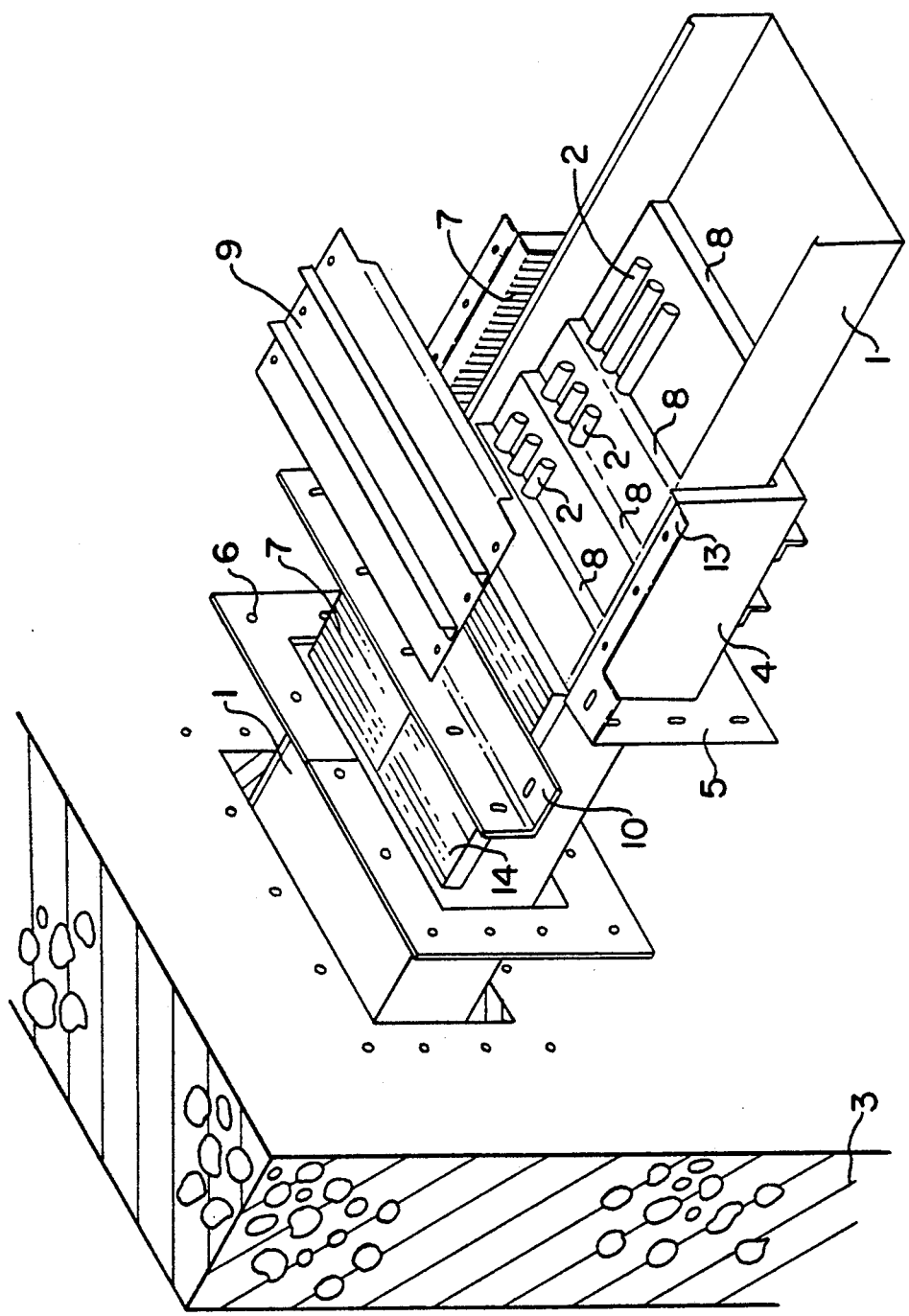
FIG. 1 is a perspective exploded view of one embodiment of the system of the present invention.
Figure 2:
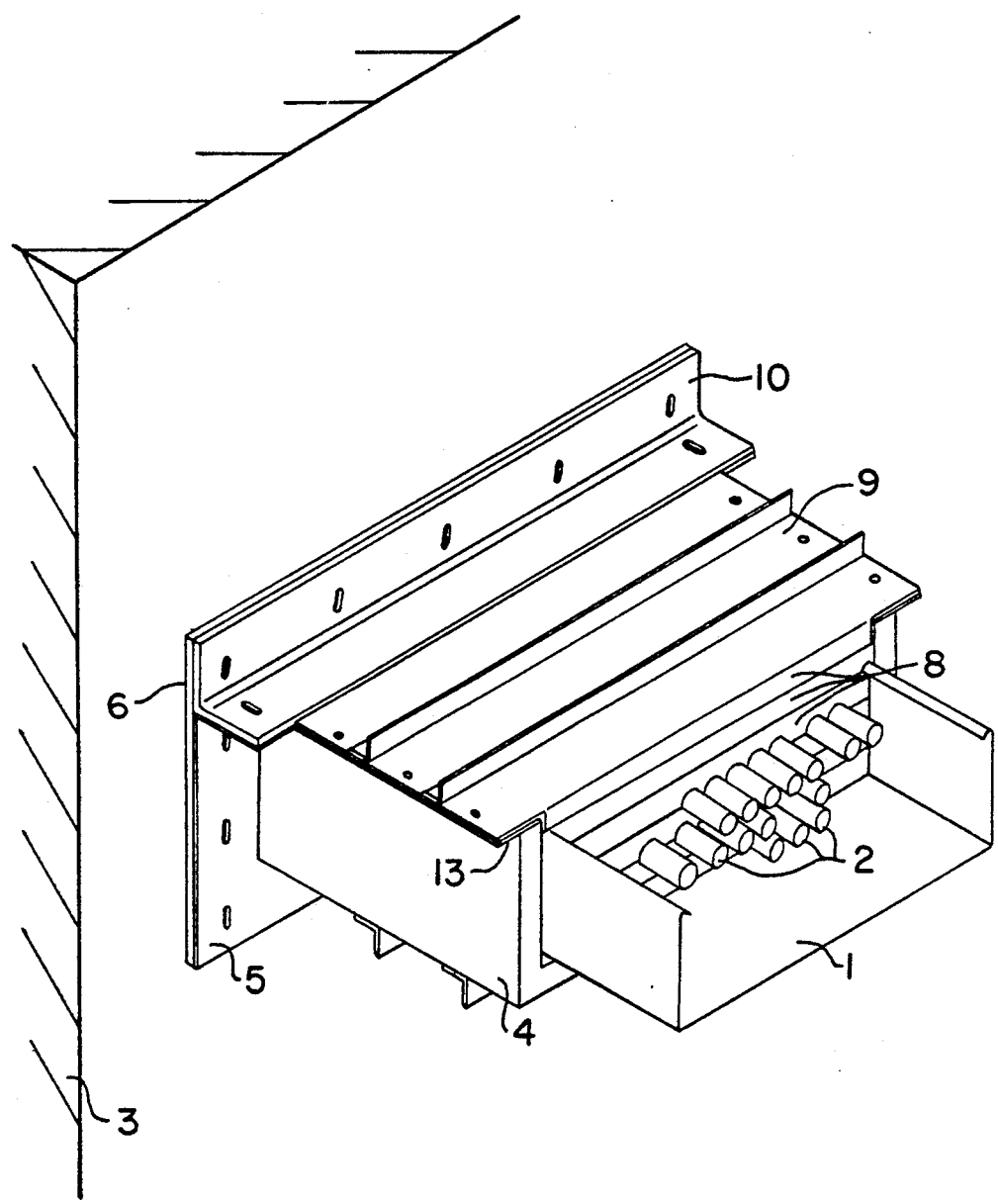
FIG. 2 is a perspective view of the embodiment of FIG. 1 in the fully mounted condition.
Figure 3:
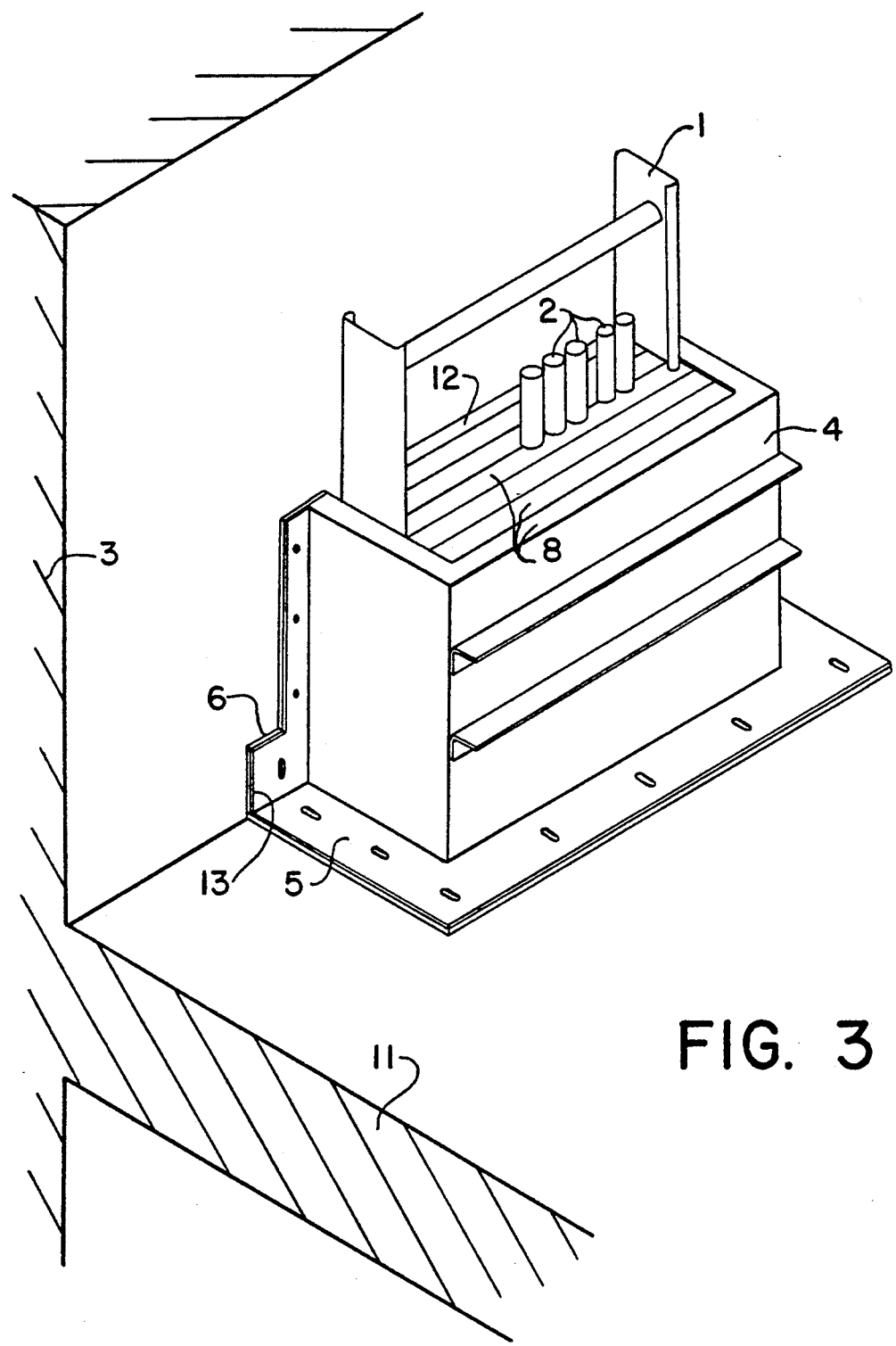
FIG. 3 is a perspective view of a second embodiment of the invention in fully mounted condition.
Figure 4:
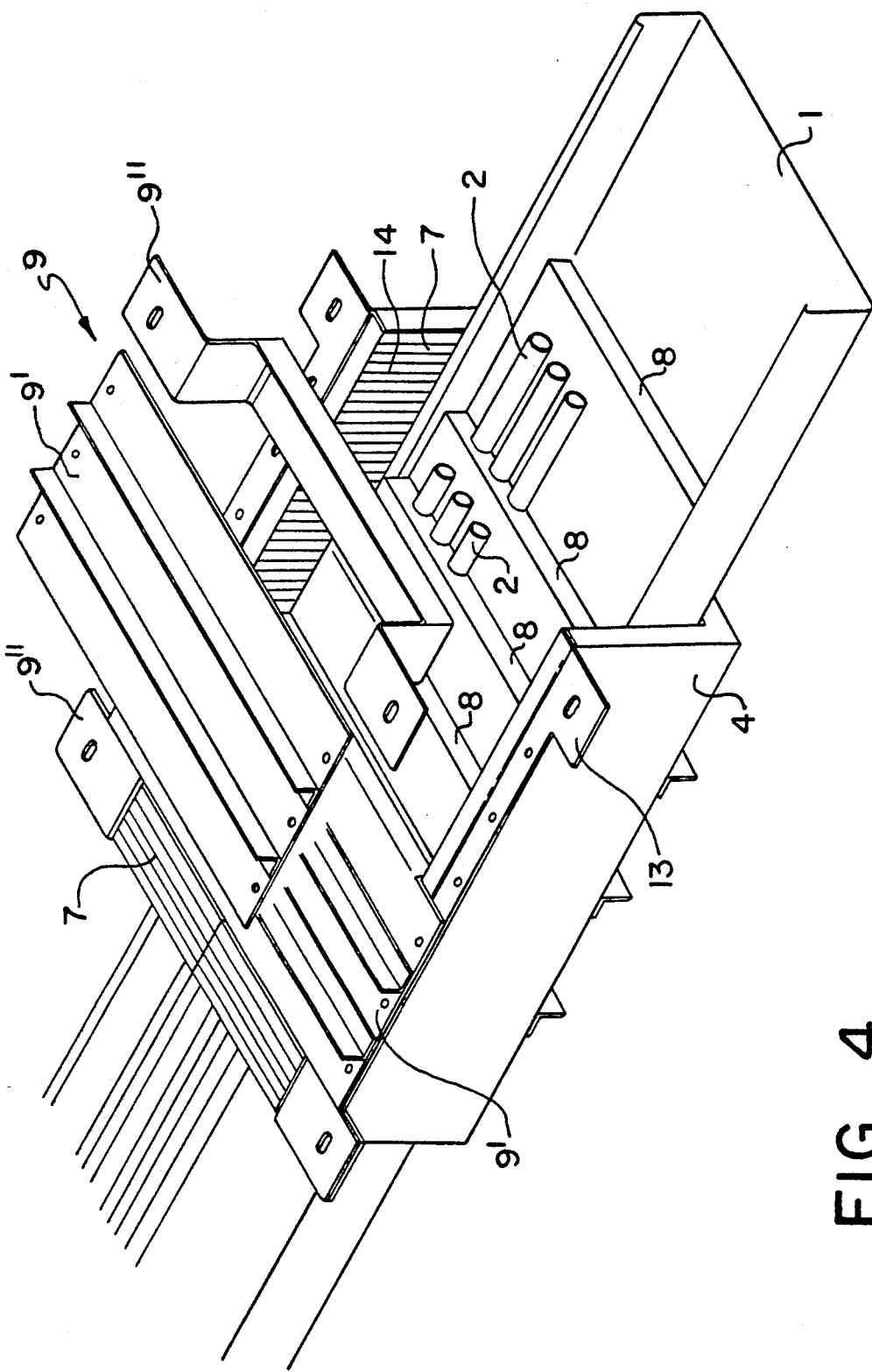
FIG. 4 is a perspective exploded view of a third embodiment of the invention.
Figure 5:
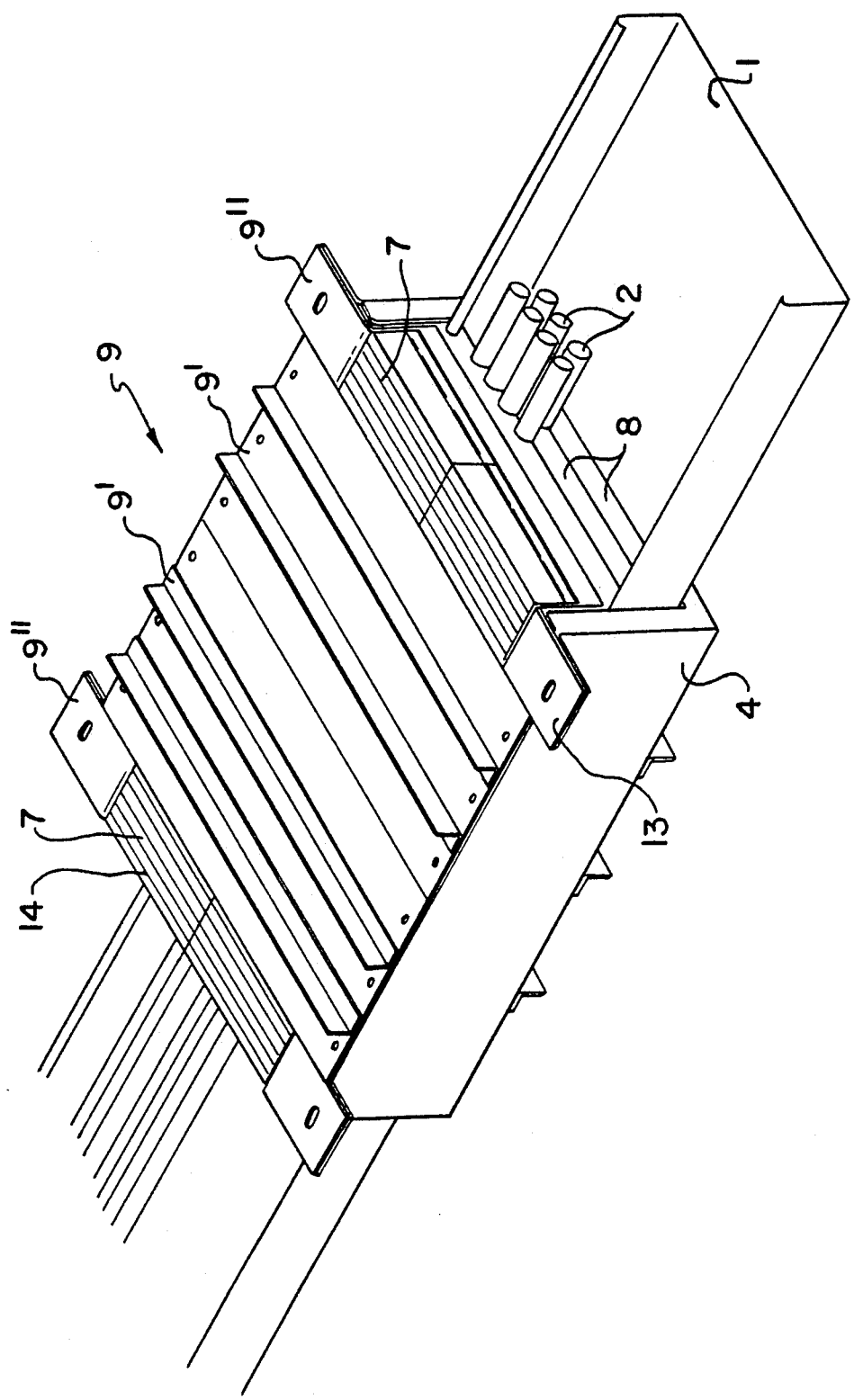
FIG. 5 is a perspective view of the embodiment of FIG. 4 in the fully mounted condition.
Figure 6:
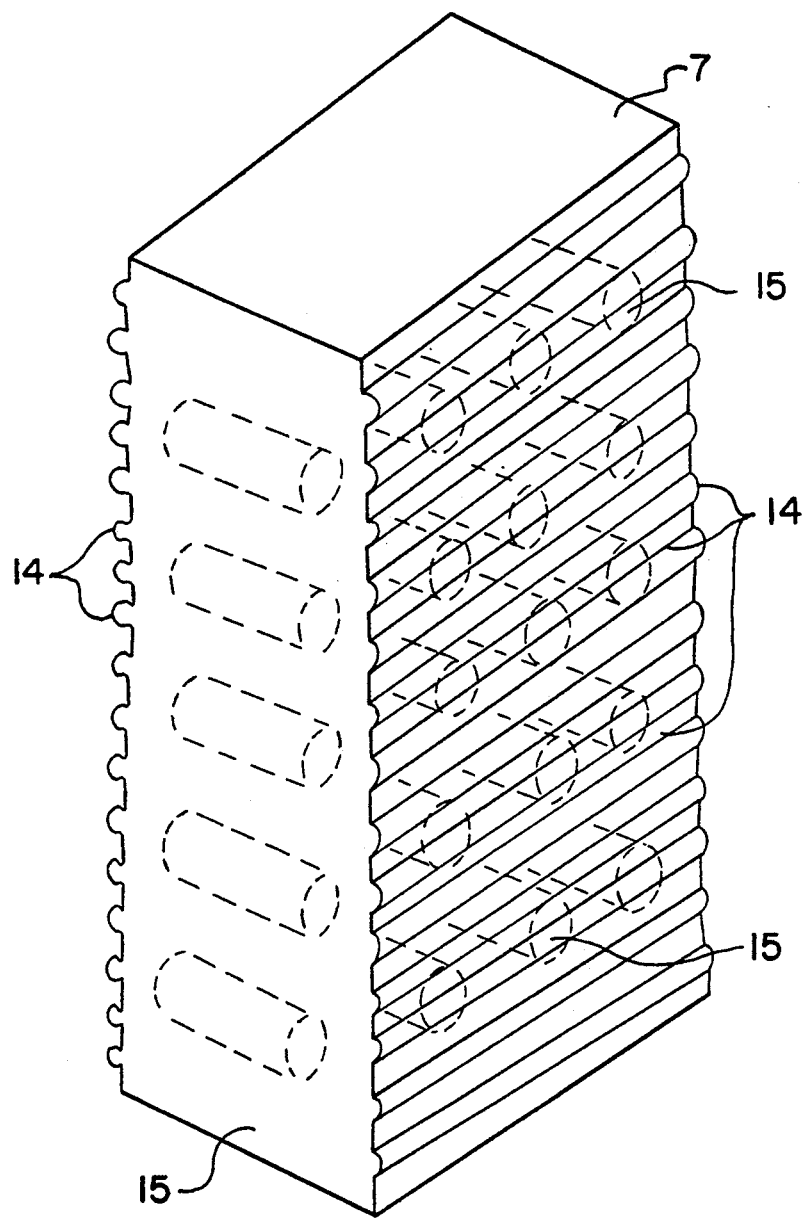
FIG. 6 is a perspective view of a sealing body according to the present invention.

I claim:

1. A safety chute system for the prevention of fire, water, or gas from propagating along cables contained in an open top channel shaped lead-through chute passing through a wall, said safety chute system comprising:
   (a) an open top channel shaped housing positioned in spaced surrounding relation with said lead-through chute externally of said wall and with the open top of the lead-through chute facing outwardly of the open top of the safety chute;
   (b) at least one sealing body of fire resisting material removably positioned in the space between the two chutes; and
   (c) cover means for covering the open top of the safety chute to fully enclose the lead-through chute therein.

2. A system according to claim 1 characterized in that said removable sealing body includes a section disposed between the cover means and the open top of the lead-through chute.

3. A system according to claim 1, characterized in that the sealing body includes spacers located along at least a part of the inner wall of the safety chute, whereby an air insulation clearance is allowed between the sealing body and the said part of the inner wall of the safety chute.

4. A system according to claim 3, characterized in that the sealing body contains at least one inner cavity.

5. A system according to claim 3, characterized in that the system is provided with a filler substantially made of a fire-resisting material, said filler being disposed in the safety chute between said cables and said sealing body and of sufficient density to prevent propagation of fire, water or gas along said cables.

6. A system according to claim 5, characterized in that the filler substantially consists of at least one spongy body which expands upon contact with fire, water or gas.

7. A system according to claim 6, characterized in that the filler contains a fire-resisting cement.

8. A system according to claim 7, characterized in that the safety chute is substantially rectangular in section, that at least four sealing bodies are detachably installed along corresponding sections of the inner wall of the safety chute, and that the filler is disposed between, below and above each layer of cables passed through the lead-through chute.

9. A system according to any one of the preceding claims 2-8, in which the cables are laid in the lead-through chute and passed through the wall, characterized in that the safety chute is installed on at least one side of the wall and includes a flange extending substantially perpendicular to the longitudinal direction of the cables for attachment to the surface of the wall, and that the safety chute cover means comprises a detachable cover plate.

10. A system according to any one of the preceding claims 2-8, in which the cables are laid in the lead-through chute and passed through the wall characterized in that the wall is a floor and extends at an angle to a side wall, the safety chute is installed on at lease one side of the floor and include a flange extending substantially perpendicular to the longitudinal direction of the cables for attachment to the surface of the floor, and that the safety chute cover means is defined by said wall.

11. A system according to either one of claims 9 and 10, characterized in that the system comprises a gasket inserted between the flange and the wall.

12. A system according to any one of the preceding claims 2-8, in which the cables are laid in a lead-through chute as part of a cable routing plan, characterized in that the safety chute is attached to the lead-through chute independently of said wall by means of the detachable cover means of the safety chute.

* * * * *